United States Patent
Ishii et al.

(10) Patent No.: US 11,196,850 B2
(45) Date of Patent: Dec. 7, 2021

(54) WIRELESS COMMUNICATION TERMINAL

(71) Applicant: PANASONIC INTELLECTUAL PROPERTY MANAGEMENT CO., LTD., Osaka (JP)

(72) Inventors: Taichiro Ishii, Kanagawa (JP); Masako Kitayama, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 17/098,821

(22) Filed: Nov. 16, 2020

(65) Prior Publication Data

US 2021/0152682 A1    May 20, 2021

(30) Foreign Application Priority Data

Nov. 20, 2019    (JP) .............................. JP2019-209712

(51) Int. Cl.
*H04M 1/02*    (2006.01)

(52) U.S. Cl.
CPC ....... *H04M 1/0266* (2013.01); *H04M 1/0262* (2013.01); *H04M 1/0264* (2013.01)

(58) Field of Classification Search
CPC ............. H04M 1/0254; H04M 1/0262; H04M 1/0264; H04M 1/0266; H04M 1/0279; H04M 1/236
USPC ............. 455/575.1, 575.8; 361/824; 345/173
See application file for complete search history.

(56) References Cited

U.S. PATENT DOCUMENTS

| | | | |
|---|---|---|---|
| 10,990,126 B1 * | 4/2021 | Amaki | H04M 1/0262 |
| 2001/0045942 A1 | 11/2001 | Uchiyama et al. | |
| 2003/0103611 A1 | 6/2003 | Lapstun et al. | |
| 2003/0142081 A1 * | 7/2003 | Iizuka | G06F 1/169 345/173 |
| 2008/0225471 A1 * | 9/2008 | Takizawa | G06F 1/1632 361/824 |
| 2012/0062370 A1 | 3/2012 | Feldstein et al. | |
| 2012/0309518 A1 | 12/2012 | Hansen et al. | |
| 2019/0332836 A1 * | 10/2019 | Mochizuki | G06F 1/1635 |
| 2021/0159714 A1 * | 5/2021 | Kitayama | H05K 5/0017 |

FOREIGN PATENT DOCUMENTS

| | | |
|---|---|---|
| JP | 10-240420 | 9/1998 |
| JP | 10-326137 | 12/1998 |
| JP | 2003-518670 | 6/2003 |

(Continued)

*Primary Examiner* — Tan H Trinh
(74) *Attorney, Agent, or Firm* — Greenblum & Bernstein, P.L.C.

(57) ABSTRACT

A wireless communication terminal includes: a body; a camera on a back surface; a code reader attachable to the back surface; a display on a front surface with top and bottom edges longer than left and right edges; and first and second buttons on the front surface. Upper, lower, left, right areas are between respective edges of the front surface and those of the display. The camera is in an area opposite the upper area. A width of the lower area is wider than each of widths of the left and right areas. The first button is in the lower area. The second button is between a center line of the body passing through a center point of the front surface and in parallel with the top or bottom edge of the front surface and a line extending from the top edge of the display.

7 Claims, 5 Drawing Sheets

(56) References Cited

FOREIGN PATENT DOCUMENTS

| | | |
|---|---|---|
| JP | 2003-296015 | 10/2003 |
| JP | 2008-235326 | 10/2008 |
| JP | 2013-081260 | 5/2013 |
| JP | 2013-176528 | 9/2013 |
| JP | 2018-181083 | 11/2018 |
| JP | 2019-192187 | 10/2019 |
| WO | 2001/041045 | 6/2001 |

* cited by examiner

WIRELESS COMMUNICATION TERMINAL

CROSS-REFERENCES TO RELATED APPLICATIONS

This application is based on and claims priority to Japanese Patent Application No. 2019-209712 filed on Nov. 20, 2019, the enter contents of which are incorporated herein by reference.

FIELD

The present disclosure relates to a wireless communication terminal.

BACKGROUND

JP-A-H10-240420 discloses a portable terminal including an A4-sized body that is a flat box, a battery attached to a back surface of the body, and a touchscreen attached to a front surface of the body.

SUMMARY

Since a relatively large portable terminal as disclosed in JP-A-H10-240420 is large in size and heavy in weight, the portable terminal may be used while being gripped by both hands. However, in JP-A-H10-240420, an operation when the terminal is gripped by both hands is not considered.

An object of the present disclosure is to provide a wireless communication terminal with improved operability when the wireless communication terminal is gripped by both hands.

The present disclosure provides a wireless communication terminal: a body that is a flat box; a camera that is on a back surface of the body, the camera having an optical axis perpendicular to the back surface of the body; a code reader that is attachable to the back surface of the body, the code reader attached to the back surface being configured to emit an upward light beam perpendicular to a top surface of the body; a display that is on a front surface of the body and is rectangular, with a top edge of the display and a bottom edge of the display that are longer than a left edge of the display and a right edge of the display; a first button that is on the front surface of the body; and a second button that is on the front surface of the body, wherein: an upper area is on the front surface of the body and is an area between a top edge of the front surface and the top edge of the display, a lower area is on the front surface of the body and is an area between a bottom edge of the front face and the bottom edge of the display, a left area is on the front surface of the body and is an area between a left edge of the front surface and the left edge of the display, a right area is on the front surface of the body and is an area between a right edge of the front surface and the right edge of the display, the camera is in an area opposite the upper area, and the area is on the back surface of the body, a width of the lower area is wider than both a width of the left area and a width of the right area, the first button is in the lower area, and the second button is in an area between a center line of the body and a line that extends from the top edge of the display, the center line passes through a center point of the front surface of the body, and the center line is in parallel with the top edge of the front surface or the bottom edge of the front surface.

According to the present disclosure, the wireless communication terminal with improved operability when the wireless communication terminal is gripped by both hands can be provided.

DETAILED DESCRIPTION

Figure 1:
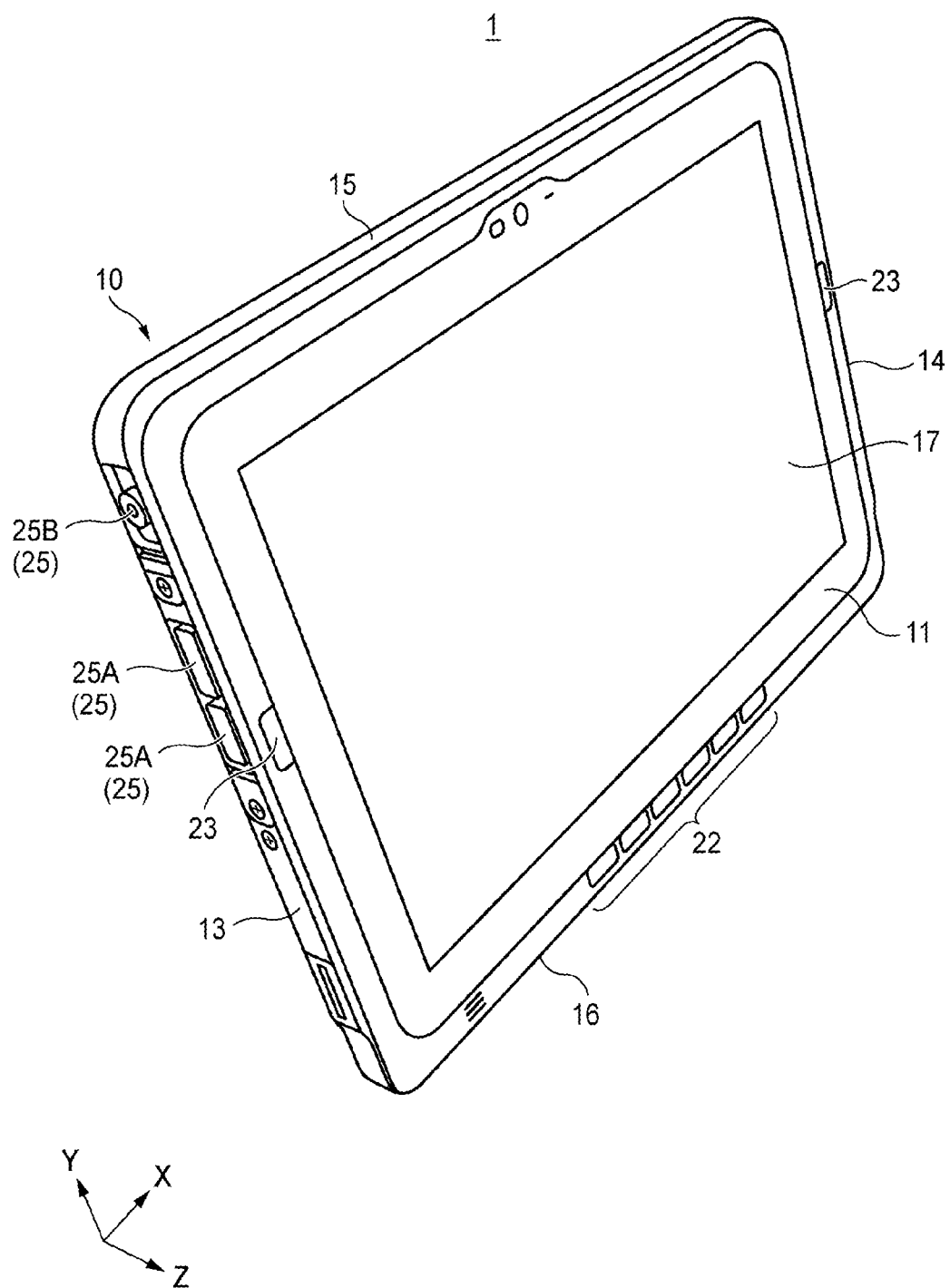
FIG. 1 is a perspective view showing an example of an external appearance of a wireless communication terminal according to an embodiment.

Hereinafter, an embodiment of the present disclosure will be described in detail with reference to the drawings as appropriate. However, unnecessarily detailed description may be omitted. For example, detailed description of well-known matters and repeated description of substantially the same configurations may be omitted. This is to avoid unnecessary redundancy in the following description and to facilitate understanding of those skilled in the art. The accompanying drawings and the following description are provided to those skilled in the art to fully understand the present disclosure, and are not intended to limit the claimed subject matter by these.

(Introduction to Present Disclosure)

A battery of a wireless communication terminal including a screen of 7 inches or more is larger in size and weight than a battery of a small wireless communication terminal such as a mobile phone. In view of stability of a weight balance of the wireless communication terminal, it is desirable that such a battery be attached to a position that is close to a bottom surface of a body and evenly spaced from both sides.

For example, when the battery is attached to the above-mentioned position of a horizontally elongated body such as a game machine, an area between a top edge of the battery and a top surface of the body is narrow, and an area between a left edge of the battery and a left side of the body and an area between a right edge of the battery and a right side of the body become large. Therefore, it becomes difficult to arrange together a substrate and components in the body in one area as much as possible.

On the other hand, in order to bring the substrate and the components together in one area as much as possible in the horizontally elongated body, when the battery is attached near any one of the sides, the weight balance of the wireless communication terminal becomes poor. In this case, an operation of the wireless communication terminal while carrying and gripping the wireless communication terminal becomes difficult.

Therefore, in the wireless communication terminal including the screen of 7 inches or more, when a ratio of a surface (that is, a front surface) to which a display of the body of the wireless communication terminal is attached has a shape closer to a square, the weight balance is stable and carrying is easy to be performed as compared with an aspect ratio of the screen.

Further, in order to reduce a burden on an arm of a user when performing an operation while gripping the wireless communication terminal, it is desirable to make movement of a hand when a button is operated as small as possible.

Further, by enabling a button operation while gripping the wireless communication terminal with both hands, the user can operate the wireless communication terminal while maintaining stability of the weight balance without attaching a gripping band for stably gripping the wireless communication terminal to the body.

Further, in the wireless communication terminal, an antenna for transmitting and receiving a radio signal is attached to a vicinity of a top surface of inside of the body, a vicinity of a side, and/or a vicinity of the bottom surface, and a connection port to which a cable is connected is attached to a side of the body. Therefore, it is difficult to attach a button to the side, the top surface, and/or the bottom surface.

In view of the above, a wireless communication terminal having improved operability in a case of gripping the wireless communication terminal with both hands by attaching a button to a position that can be easily operated while gripping the wireless communication terminal with both hands will be described below.

Embodiment

Figure 2:
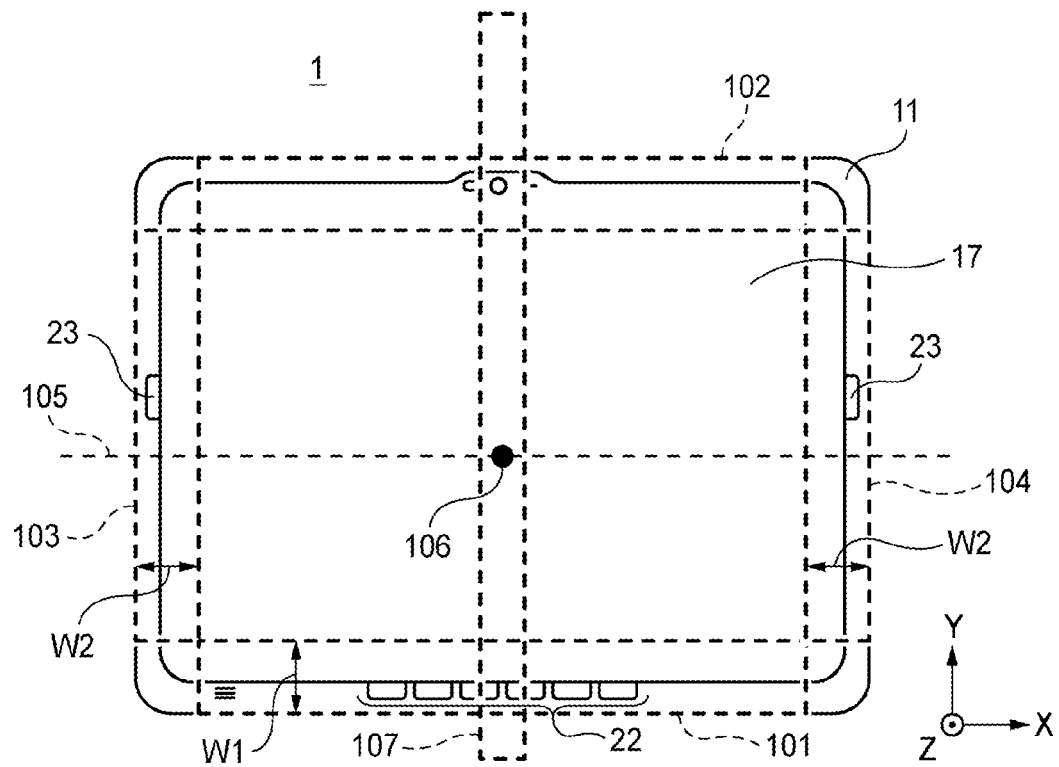
FIG. 2 is a front view showing the example of the external appearance of the wireless communication terminal according to the embodiment.
Figure 3:
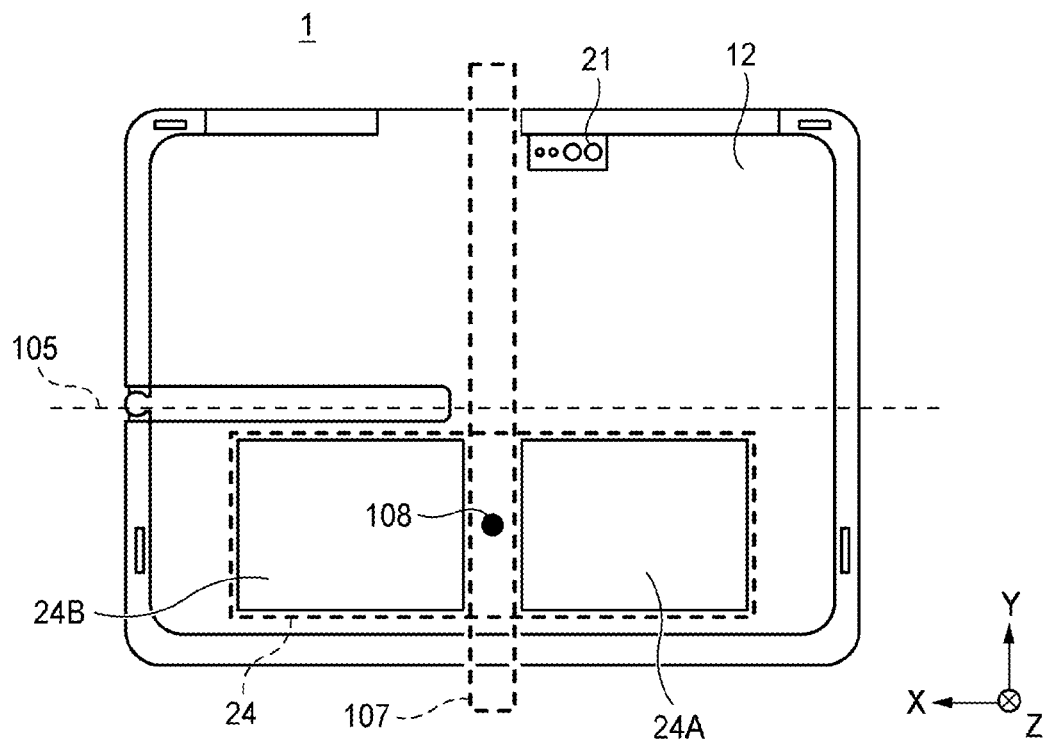
FIG. 3 is a rear view showing the example of the external appearance of the wireless communication terminal according to the embodiment.
Figure 4:
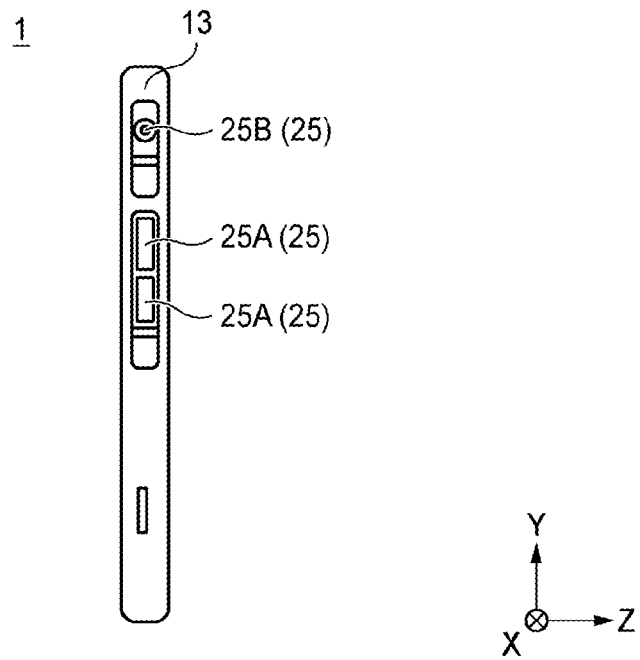
FIG. 4 is a left side view showing the example of the external appearance of the wireless communication terminal according to the embodiment.
Figure 5:
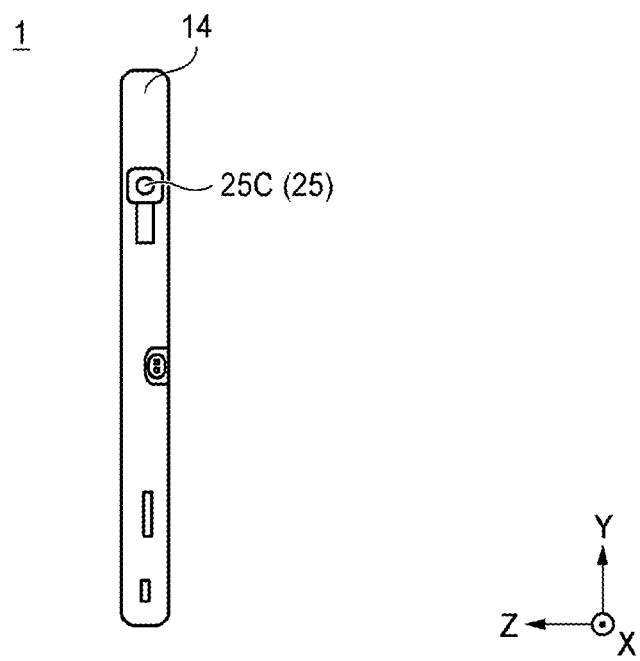
FIG. 5 is a right side view showing the example of the external appearance of the wireless communication terminal according to the embodiment.
Figure 6:
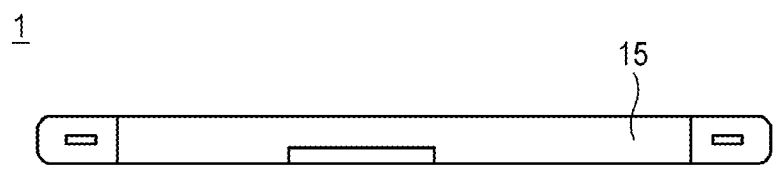
FIG. 6 is a plan view showing the example of the external appearance of the wireless communication terminal according to the embodiment.
Figure 6:
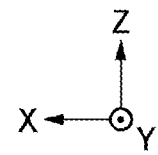
Figure 7:
FIG. 7 is a bottom view showing the example of the external appearance of the wireless communication terminal according to the embodiment.
Figure 7:
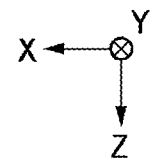

FIGS. 1 to 7 are diagrams showing an example of an external appearance of a wireless communication terminal according to an embodiment. FIG. 1 is a perspective view. FIG. 2 is a front view. FIG. 3 is a rear view. FIG. 4 is a left side view. FIG. 5 is a right side view. FIG. 6 is a plan view. FIG. 7 is a bottom view.

In the description of the present disclosure, in the drawings, a positive direction of an X-axis may be referred to as right, a negative direction of the X-axis may be referred to as left, a positive direction of a Y-axis may be referred to as up, a negative direction of the Y-axis may be referred to as down, a positive direction of a Z-axis may be referred to as front, and a negative direction of the Z-axis may be referred to as a depth.

The wireless communication terminal 1 is an example of an electronic device and is, for example, a smartphone, a mobile phone, a tablet, a digital camera, a portable personal computer, or a wireless device. In the present embodiment, the tablet wireless communication terminal 1 having performances such as shock resistance, vibration resistance, drip-proof and dust-proof and having a weight heavier than a general terminal will be described. The wireless communication terminal 1 can be used in a harsh environment for the electronic device, such as a factory, a construction site, public safety work, and transportation work. The wireless communication terminal 1 is not limited to business use and may be used by an individual.

<Body>

As shown in FIGS. 1 to 7, a body 10 of the wireless communication terminal 1 is a flat box, and includes a front surface 11 that is a surface disposed on front of the body 10, a back surface 12 that is an inner surface of the body 10, a left side 13 that is a surface of the body 10 on a left side, a right side 14 that is a surface of the body 10 on a right side, a top surface 15 that is a surface of the body 10 on an upper side, and a bottom surface 16 that is a surface of the body 10 on a lower side.

As shown in FIG. 2, a shape of the front surface 11 is a horizontally long rectangle in which a top edge and a bottom edge are longer than a left edge and a right edge and corners are rounded. The shape of the front surface 11 is not limited to the rectangle and may be a square with rounded corners.

A touchscreen 17 used for both input and display is attached to a center of the front surface 11. For example, the touchscreen 17 is configured by a combination of a display device such as a liquid crystal panel or an organic electro luminescence (EL) panel and a position input device such as a touchpad. The display device that constitutes the touchscreen 17 may be read as another term such as a screen, a display, and a monitor.

As shown in FIG. 2, a shape of the touchscreen 17 is a horizontally long rectangle in which a top edge and a bottom edge are longer than a left edge and a right edge. For example, an aspect ratio of the touchscreen 17 is 16:10. The touchscreen 17 is attached such that a top edge or a bottom edge of the touchscreen 17 is parallel to a top edge or a bottom edge of the front surface 11. A length of a diagonal line of the touchscreen 17 is 7 inches or more, for example, 7 inches or 10.1 inches.

As shown in FIG. 3, a shape of the back surface 12, similar to the shape of the front surface 11, is a horizontally long rectangle in which a top edge and a bottom edge are longer than a left edge and a right edge and corners are rounded. When the shape of the front surface 11 is a square with rounded corners, the shape of the back surface 12 may also be a square with rounded corners.

As shown in FIG. 4, a shape of the left side 13 is a vertically long rectangle in which a left edge of the front surface 11 and a left edge of the back surface 12 are long and corners are rounded. As shown in FIG. 5, a shape of the right side 14 is a vertically long rectangle in which a right edge of the front surface 11 and a right edge of the back surface 12 are long and corners are rounded.

As shown in FIG. 6, a shape of the top surface 15 is a horizontally long rectangle in which a top edge of the front surface 11 and a top edge of the back surface 12 are long and corners are rounded. As shown in FIG. 7, a shape of the bottom surface 16 is a horizontally long rectangle in which a bottom edge of the front surface 11 and a bottom edge of the back surface 12 are long and corners are rounded.

In the description of the present disclosure, as shown in FIG. 2, an area between the bottom edge of the front surface 11 and the bottom edge of the touchscreen 17 is referred to as a lower area 101. An area between the top edge of the front surface 11 and the top edge of the touchscreen 17 is referred to as an upper area 102. An area between the left edge of the front surface 11 and the left edge of the touchscreen 17 is referred to as a left area 103. An area between the right edge of the front surface 11 and the right edge of the touchscreen 17 is referred to as a right area 104.

An imaginary line that passes through a center point 106 of the front surface 11 and is parallel to the top edge and the bottom edge of the front surface 11 is referred to as a center line 105. A strip-shaped imaginary area that includes the center point 106 of the front surface 11, has a width of 2 cm in a horizontal direction (X direction), and extends in a vertical direction (Y direction) is referred to as a strip-shaped area 107. The width of the strip-shaped area 107 may be larger or smaller than 2 cm.

A width W1 of the lower area 101 in the vertical direction (Y direction) is larger than a width W2 of the left area 103 and the right area 104 in the horizontal direction (X direction). Accordingly, since an aspect ratio of the front surface 11 is close to a square as compared with the aspect ratio of the touchscreen 17, the weight balance of the wireless communication terminal 1 is stable, and the user can easily operate the wireless communication terminal 1 while carrying and gripping the wireless communication terminal 1.

An antenna for wireless communication (not shown) may be provided in the vicinity of the top surface 15 of inside of the body 10, the left side 13 and/or the right side 14. The antenna corresponds to, for example, wireless communication based on Wi-Fi (registered trademark), Bluetooth (registered trademark), long term evolution (LTE), a fourth-generation mobile communication system (4G) and/or a fifth-generation mobile communication system (5G).

<Camera>

As shown in FIG. 3, a camera 21 is attached to the back surface 12 of the body 10. For example, the camera 21 is attached to an area of the back surface 12 that faces the area between the top edge of the front surface 11 and the top edge of the touchscreen 17 (that is, the upper area 102). An optical axis of the camera 21 is perpendicular to the back surface 12. The user grips left and right sides of the body 10 with both hands and directs the back surface 12 toward an object to be imaged, so that the camera 21 can image the object.

<First Button>

As shown in FIG. 2, at least one first button 22 is attached to the front surface 11 of the body 10. In FIG. 2, six first buttons 22 are attached. For example, the first buttons 22 are attached to the lower area 101. One of the first buttons 22 (for example, the rightmost first button 22) may be a power key for turning on/off a power supply of the wireless communication terminal 1. A shape of a first button 22 is a horizontally long rectangle. However, the shape of the first button 22 is not limited to the rectangle and may be, for example, a square, a circle, or an ellipse.

<Second Button>

As shown in FIG. 2, at least one second button 23 is attached to the front surface 11 of the body 10. The second button 23 is attached to at least one of the left area 103 and the right area 104 of the front surface 11. In FIG. 2, the second buttons 23 are attached to both the left area 103 and the right area 104. A shape of a second button 23 is a vertically long rectangle. However, the shape of the second button 23 is not limited to the vertically long rectangle and may be, for example, a horizontally long rectangle, a square, a circle, or an ellipse.

At least one of the second buttons 23 may be assigned a function (for example, a scanning function) for operating a bar-code reader 30 (see FIG. 8) to be described later. At least one of the second buttons 23 may be assigned a function (for example, a shutter function) for operating the camera 21. A common function may be assigned to the second buttons 23 of both the left area 103 and the right area 104, or different functions may be assigned to the respective second buttons 23 of the left area 103 and the right area 104. Assignment of a function to a second button 23 may be optionally set by the user.

As described above, by attaching the second buttons 23 to the front surface 11 of the body 10, the user can press a second button 23 with a thumb while gripping the body 10 of the wireless communication terminal 1 from left and right sides. That is, operability while the wireless communication terminal 1 is gripped by both hands is improved.

<Battery Storage Space>

As shown in FIG. 3, inside the body 10 of the wireless communication terminal 1, two battery storage spaces 24A and 24B for storing batteries are formed side by side in the horizontal direction. In the present disclosure, when the two battery storage spaces 24A and 24B are included in the description, the two battery storage spaces are referred to as a battery storage space 24. The battery storage space 24 is formed in an area between the bottom edge of the back surface 12 and the center line 105 such that a center point 108 of the battery storage space 24 is positioned in the strip-shaped area 107.

Accordingly, by forming the battery storage space 24 at a lower side of the body 10, the weight balance of the wireless communication terminal 1 while the batteries are mounted is stable, and the user can easily operate the wireless communication terminal 1 while carrying and gripping the wireless communication terminal 1.

<Connection Port>

As shown in FIGS. 4 and 5, connection ports 25 are attached to the left side 13 and/or the right side 14 of the body 10. The connection ports 25 are, for example, a USB connection port 25A to which a universal serial bus (USB) device is connected, a power supply connection port 25B to which a power supply cable is connected, and an audio connection port 25C to which an audio cable is connected. A connection port 25 may be read as another term such as a connector or an adapter.

One of the connection ports 25 of the left side 13 may be positioned on a left side of a second button 23 of the left area 103. For example, a length from the bottom surface 16 of the body 10 to a bottom edge of the second button 23 of the left area 103 is equal to a length from the bottom surface 16 of the body 10 to a bottom edge of the connection port 25 of the left side 13. In other words, the bottom edge of the connection port 25 of the left side 13 is aligned with the bottom edge of the second button 23 of the left area 103. Alternatively, the length from the bottom surface 16 of the body 10 to the bottom edge of the second button 23 of the left area 103 is smaller than the length from the bottom surface 16 of the body 10 to the bottom edge of the connection port 25 of the left side 13. In other words, the bottom edge of the connection port 25 of the left side 13 is higher than the bottom edge of the second button 23 of the left area 103.

One of the connection ports 25 of the right side 14 may be positioned on a right side of a second button 23 of the right area 104. For example, a length from the bottom surface 16 of the body 10 to a bottom edge of the second button 23 of the right area 104 is equal to a length from the bottom surface 16 of the body 10 to a bottom edge of the connection port 25 of the right side 14. In other words, the bottom edge of the connection port 25 of the right side 14 is aligned with the bottom edge of the second button 23 of the right area 104. Alternatively, the length from the bottom surface 16 of the body 10 to the bottom edge of the second button 23 of the right area 104 is smaller than the length from the bottom surface 16 of the body 10 to the bottom edge of the connection port 25 of the right side 14. In other words, the bottom edge of the connection port 25 of the right side 14 is higher than the bottom edge of the second button 23 of the right area 104.

The connection ports 25 of the left side 13 and/or the right side 14 and the second buttons 23 are arranged accordingly, so that even when a cable is connected to a connection port 25, the user can press a second button 23 with a thumb while gripping the wireless communication terminal 1 from the left and right sides without being disturbed by the cable connected to the connection port 25.

<Bar-Code Reader>

Figure 8:
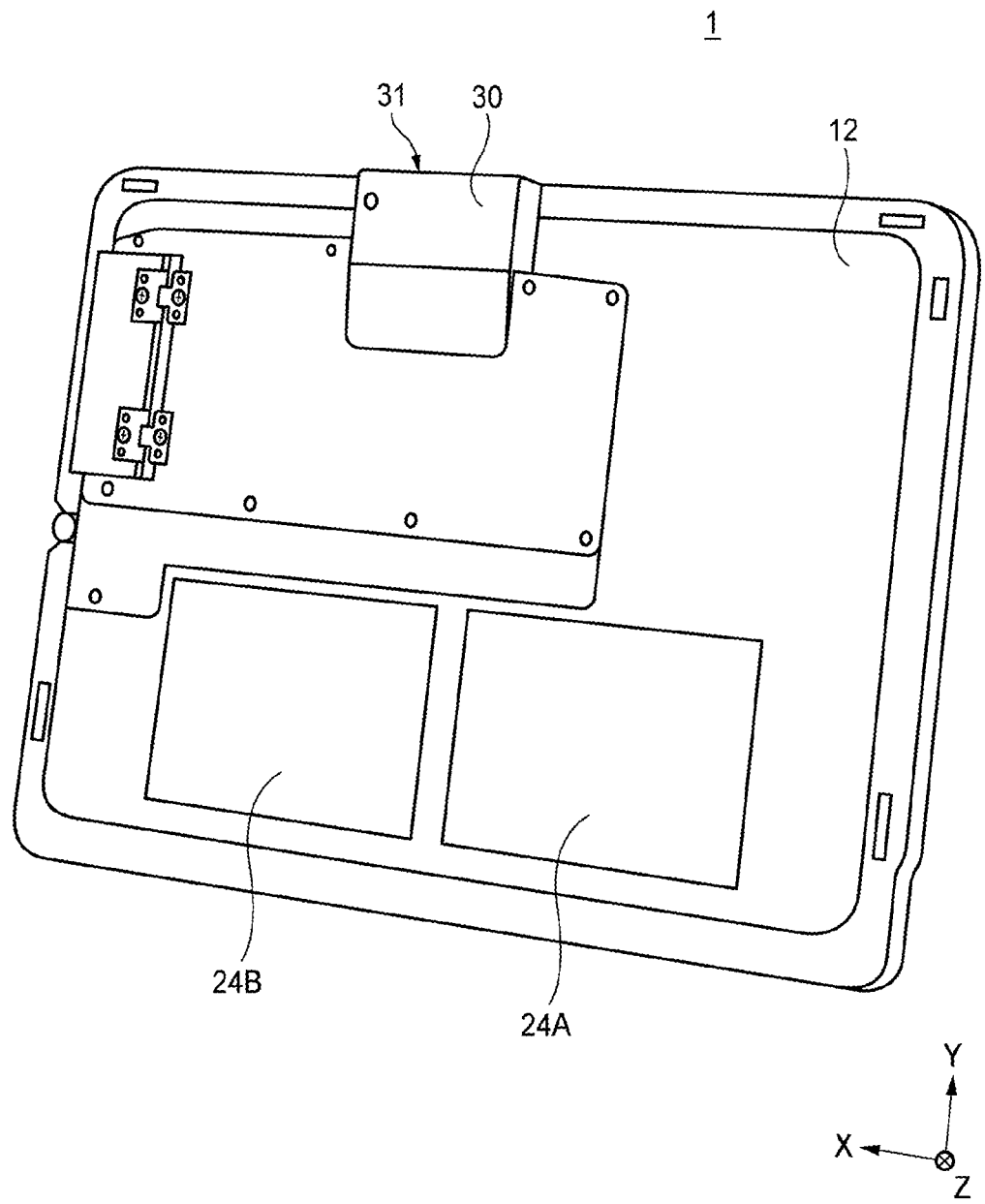
FIG. 8 is a perspective view showing an example in a case where a bar-code reader is mounted on the wireless communication terminal according to the embodiment.

FIG. 8 is a perspective view showing an example in a case where a bar-code reader 30 is mounted on the wireless communication terminal 1.

As shown in FIG. 8, in the wireless communication terminal 1, the detachable bar-code reader 30 can be mounted on the back surface 12 of the body 10. The bar-code reader 30 includes an irradiation port 31 for emitting a light beam. The irradiation port 31 of the bar-code reader 30 attached to the back surface 12 of the body 10 is opened in parallel with the top surface 15 and upward. That is, the bar-code reader 30 attached to the back surface 12 of the body 10 emits a light beam that is perpendicular to the top surface 15 and is upward (in the positive direction of the Y-axis).

A bar-code scanning execution operation, which is an example of a function of operating the bar-code reader 30, may be assigned to the second buttons 23. Accordingly, the user can easily scan a bar code by directing the top surface 15 (that is, the irradiation port 31) toward the bar code and pressing a second button 23 with a thumb while gripping the body 10 of the wireless communication terminal 1 with both hands.

The bar-code reader 30 is an example of a code reader. A code reader that reads a two-dimensional code or a character code may be mounted on the back surface 12 of the wireless communication terminal 1.

Summary of Present Disclosure

The wireless communication terminal (1) according to an aspect of the present disclosure includes the body (10) that is a flat box, the display (17), at least one first button (22), and at least one second button (23) that are attached to the front surface (11) of the body, and the camera (21) that is attached to the back surface (12) of the body and has the optical axis perpendicular to the back surface. The shape of the display is a rectangle in which the top edge and the bottom edge are longer than the left edge and the right edge. The position of the camera is within the area of the back surface that faces the upper area (102) that is the area between the top edge of the front surface and the top edge of the display. The vertical width of the lower area (101) that is the area between the bottom edge of the front surface and the bottom edge of the display is larger than both the horizontal width of the left area (103) that is the area between the left edge of the front surface and the left edge of the display and the horizontal width of the right area (104) that is the area between the right edge of the front surface and the right edge of the display. A position of a first button is within the lower area. A position of a second button is within the area between the center line (105) and the line obtained by extending the top edge of the display, in the left area or the right area. The center line (105) passes through the center point (106) of the front surface and is parallel to the top edge or the bottom edge of the front surface. According to this configuration, when the wireless communication terminal is gripped from the left and right sides, since the second button is positioned in the vicinity of a thumb, the operability of the wireless communication terminal when the wireless communication terminal is gripped by both hands is improved. Since the vertical width of the lower area that is the area between the bottom edge of the front surface and the bottom edge of the display is larger than both the horizontal width of the left area that is the area between the left edge of the front surface and the left edge of the display and the horizontal width of the right area that is the area between the right edge of the front surface and the right edge of the display, the shape of the front surface is close to a square and the weight balance of the wireless communication terminal is stable.

There may be no button on the top surface (15), the left side (13), and the right side (14) of the body (10). One of the first buttons may be a power button.

The wireless communication terminal (1) may further include the code reader (30) that is attached to the back surface (12) of the body (10) and emits the upward light beam perpendicular to the top surface (15) of the body. Then, a function for operating the code reader (30) may be assigned to a second button (23). According to this configuration, the wireless communication terminal is gripped from the left and right sides, the top surface of the body is directed toward a code, and a second button is operated, so that the code can be easily scanned by the code reader.

The wireless communication terminal (1) may further include the battery storage space (24) that is formed inside the body (10) and is for storing a battery. The position of the battery storage space is within the area between the bottom edge of the back surface (12) and the center line (105). The center point (108) of the battery storage space may be within the strip-shaped area (107) having a width of 2 cm that includes the center point (106) of the front surface (11) and extends in the horizontal direction. According to this configuration, since a battery having a large weight is attached to a center of a vicinity of the bottom surface (16) of the body, the weight balance when the wireless communication terminal is gripped from the left and right sides is stable.

The second buttons (23) may be attached to both the left area (103) and the right area (104). Then, a common function may be assigned to a second button in the left area and a second button in the right area. According to this configuration, when the wireless communication terminal is gripped from the left and right sides, the common function can be called from both a left thumb and a right thumb.

The wireless communication terminal (1) may further include the connection port (25) attached to the left side (13) of the body (10). The length from the bottom surface (16) of the body to the bottom edge of the second button (23) of the left area (103) may be equal to or smaller than the length from the bottom surface of the body to the bottom edge of the connection port of the left side. The wireless communication terminal (1) may further include the connection port (25) attached to the right side (14) of the body (10). The length from the bottom surface (16) of the body to the bottom edge of the second button (23) of the right area (104) may be equal to or smaller than the length from the bottom surface of the body to the bottom edge of the connection port of the right side. According to this configuration, even when a cable is connected to a connection port, the user can press a second button with a thumb while gripping the wireless communication terminal from the left and right sides without being disturbed by the cable connected to the connection port.

Although the embodiment has been described above with reference to the accompanying drawings, the present disclosure is not limited to such examples. It will be apparent to those skilled in the art that various changes, modifications, substitutions, additions, deletions, and equivalents can be conceived within the scope of the claims, and it should be understood that such changes and the like also belong to the technical scope of the present disclosure. Constituent elements in the above-described embodiment may be optionally combined within a range not departing from the spirit of the invention.

The present disclosure is useful for an electronic device that requires improved operability in a gripped state.

The invention claimed is:

1. A wireless communication terminal comprising:
   a body that is a flat box;
   a camera that is on a back surface of the body, the camera having an optical axis perpendicular to the back surface of the body;
   a code reader that is attachable to the back surface of the body, the code reader attached to the back surface being configured to emit an upward light beam perpendicular to a top surface of the body;
   a display that is on a front surface of the body and is rectangular, with a top edge of the display and a bottom edge of the display that are longer than a left edge of the display and a right edge of the display;
   a first button that is on the front surface of the body; and
   a second button that is on the front surface of the body, wherein:
   an upper area is on the front surface of the body and is an area between a top edge of the front surface and the top edge of the display,
   a lower area is on the front surface of the body and is an area between a bottom edge of the front face and the bottom edge of the display,
   a left area is on the front surface of the body and is an area between a left edge of the front surface and the left edge of the display,
   a right area is on the front surface of the body and is an area between a right edge of the front surface and the right edge of the display,
   the camera is in an area opposite the upper area, and the area is on the back surface of the body,
   a width of the lower area is wider than both a width of the left area and a width of the right area,
   the first button is in the lower area, and
   the second button is in an area between a center line of the body and a line that extends from the top edge of the display, the center line passes through a center point of the front surface of the body, and the center line is in parallel with the top edge of the front surface or the bottom edge of the front surface.

2. The wireless communication terminal according to claim 1, wherein:
   the second button is for operating the code reader.

3. The wireless communication terminal according to claim 2, wherein:
   there are no buttons on the top surface of the body, a left side of the body, and a right side of the body.

4. The wireless communication terminal according to claim 2, wherein:
   the second button comprises a left second button and a right second button in the left area and the right area, respectively, and
   the left second button in the left area and the right second button in the right area are for same operation of the code reader.

5. The wireless communication terminal according to claim 1, wherein:
   the first button is a power button of the wireless communication terminal.

6. The wireless communication terminal according to claim 1, further comprising:
   a battery storage space that is a space in the body for storing a battery, and the space is in an area between a bottom edge of the back surface and the center line of the body, wherein:
   a center point of the battery storage space is within a strip-shaped area having a width of 2 cm that spreads in a left-right direction, and the strip-shaped area includes the center point of the front surface of the body.

7. The wireless communication terminal according to claim 1, further comprising:
   a connection port that is on a left side of the body or a right side of the body, wherein:
   a length from a bottom surface of the body to a bottom edge of the second button is less than or equal to a length from the bottom surface of the body to a bottom edge of the connection port.

* * * * *